(12) United States Patent
Truax et al.

(10) Patent No.: US 10,776,780 B2
(45) Date of Patent: Sep. 15, 2020

(54) AUTOMATED REISSUANCE SYSTEM FOR PREPAID DEVICES

(71) Applicant: Visa International Service Association, San Francisco, CA (US)

(72) Inventors: Garrett Truax, Centennial, CO (US); Nyssa L. Zabel, Denver, CO (US); Laura Kidd, Evergreen, CO (US)

(73) Assignee: Visa International Service Association, San Francisco, CA (US)

( * ) Notice: Subject to any disclaimer, the term of this patent is extended or adjusted under 35 U.S.C. 154(b) by 521 days.

(21) Appl. No.: 15/166,961

(22) Filed: May 27, 2016

(65) Prior Publication Data

US 2017/0344978 A1 Nov. 30, 2017

(51) Int. Cl.
*G06Q 40/00* (2012.01)
*G06Q 20/36* (2012.01)
*G06Q 20/40* (2012.01)
*G06Q 20/34* (2012.01)

(52) U.S. Cl.
CPC ....... *G06Q 20/3674* (2013.01); *G06Q 20/354* (2013.01); *G06Q 20/3552* (2013.01); *G06Q 20/3672* (2013.01); *G06Q 20/405* (2013.01); *G06Q 20/409* (2013.01)

(58) Field of Classification Search
CPC ............. G06Q 20/3674; G06Q 20/355; G06Q 20/3552; G06Q 20/354
See application file for complete search history.

(56) References Cited

U.S. PATENT DOCUMENTS

| | | | | |
|---|---|---|---|---|
| 7,600,674 B1* | 10/2009 | Marah | ................. | G06Q 20/349 235/375 |
| 7,806,323 B2* | 10/2010 | Fomitchev | ............. | G06Q 20/04 235/380 |
| 8,805,736 B2* | 8/2014 | Melik-Aslanian | ..... | G06Q 20/24 705/38 |
| 2004/0249752 A1 | 12/2004 | Prato | | |
| 2005/0130735 A1 | 6/2005 | Ellis | | |

(Continued)

FOREIGN PATENT DOCUMENTS

| | | | |
|---|---|---|---|
| JP | 2003/30564 | * | 1/2003 |
| JP | 2016/200939 | * | 12/2006 |
| WO | WO-9641315 A1 | * | 12/1996 |

OTHER PUBLICATIONS

Anonymous, "Gift Cards and Gift Certificates Statutes and Legislation," www.ncsl.org/research/financial-services-and-commerce (Year: 2016).*

(Continued)

*Primary Examiner* — Alexander G Kalinowski
*Assistant Examiner* — William B. Bunker
(74) *Attorney, Agent, or Firm* — Kilpatrick Townsend & Stockton

(57) ABSTRACT

Described herein is a system for automatically reissuing a prepaid device for an expired account upon detecting a funding event associated with the expired account. An account may be expired upon determining that one or more expiration conditions have been met. An event handler may be configured to receive events. Upon identifying a funding event associated with an expired account, the event handler may initiate a reissuance process for a prepaid device associated with the account.

14 Claims, 6 Drawing Sheets

(56) References Cited

U.S. PATENT DOCUMENTS

| | | | | |
|---|---|---|---|---|
| 2006/0155643 A1* | 7/2006 | Shuman | ............... | G06Q 20/102 |
| | | | | 705/40 |
| 2010/0019030 A1* | 1/2010 | Monk | .................... | G06Q 20/20 |
| | | | | 235/380 |
| 2013/0232081 A1* | 9/2013 | Antoo | .................... | G06Q 20/38 |
| | | | | 705/44 |
| 2014/0258099 A1* | 9/2014 | Rosano | ................ | G06Q 20/409 |
| | | | | 705/39 |
| 2015/0081490 A1* | 3/2015 | Bobenhouse | .......... | G06Q 40/02 |
| | | | | 705/35 |
| 2016/0155124 A1* | 6/2016 | Howe | .................. | G06Q 20/382 |
| | | | | 705/44 |
| 2016/0180306 A1* | 6/2016 | Koeppel | ............. | G06Q 20/105 |
| | | | | 705/41 |

OTHER PUBLICATIONS

Hausken and Bruening, "Hidden Costs and Benefits of Government Card Technologies," IEEE Technology and Society Magazine, Summer 1994 (Year: 1994).*

* cited by examiner

AUTOMATED REISSUANCE SYSTEM FOR PREPAID DEVICES

BACKGROUND

Current methods for distributing devices such as prepaid cards when an entity other than the actual cardholders actually fund the prepaid accounts are cumbersome and time consuming. For example, a user such as an unemployed worker may receive unemployment benefits in the form of a prepaid card instead of a check. That user may then use the prepaid card to conduct purchase. At some point in time, the user may obtain employment and may no longer be eligible to receive funds on that prepaid card from the governmental agency providing the unemployment benefit. At a still later point in time, the user may again become unemployed and may be entitled to receive unemployment benefits again.

In the above example, when the user receives unemployment benefits the second time, the user may have lost or misplaced the original prepaid card that the user had received when the user was first employed. While a new prepaid card and account could be created for the user when the user is unemployed the second time, this is particularly cumbersome and requires action on the part of the government, an issuing bank, and the user. The user may need to provide new credentials to the issuing bank before a new prepaid card is received. It is apparent that this may involve multiple communications between multiple parties, thereby consuming computing resources, time and energy.

Embodiments of the invention address these and other problems, individually and collectively.

BRIEF SUMMARY

Embodiments of the invention are directed to a system and method for automating reissuance of a prepaid device. A prepaid device account may be set to an expired status upon determining that expiration conditions have been met by the account. At a later time, a funding event may be detected with respect to the account. Upon detecting the funding event, the system may initiate a reissuance process automatically (e.g., without human intervention).

One embodiment of the invention is directed to a method comprising determining that a prepaid account used by a user has expired, and changing a status of the prepaid account to reflect that it is an expired prepaid account. The method further comprises receiving an indication of a funding event related to the expired prepaid account, determining that the funding event is in compliance with one or more reissuance policies, and automatically re-issuing a prepaid device associated with the account to the user.

Another embodiment of the invention is directed to an authorization processor comprising of one or more processors and a memory including instructions that, when executed with the processor, cause the authorization processor to detect that an account associated with a prepaid device has lapsed and update the status of the account to indicate an expired status. The instructions further cause the authorization processor to receive an indication of a funding event associated with the account, determine that the funding event is in compliance with one or more policies associated with the account, and increase an account balance associated with the account by an amount indicated in the funding event.

Another embodiment of the invention is directed to a non-transitory computer readable medium storing specific computer-executable instructions that, when executed by a processor, cause a computer system to at least determine that a prepaid account used by a user has expired, and change a status of the prepaid account to reflect that it is an expired prepaid account. The computer-executable instructions further cause the computer system to receive an indication of a funding event related to the expired prepaid account, determine that the funding event is in compliance with one or more reissuance policies, and automatically re-issue a prepaid device associated with the account to the user.

These and other embodiments of the invention are described in further detail below.

DETAILED DESCRIPTION

Figure 1:
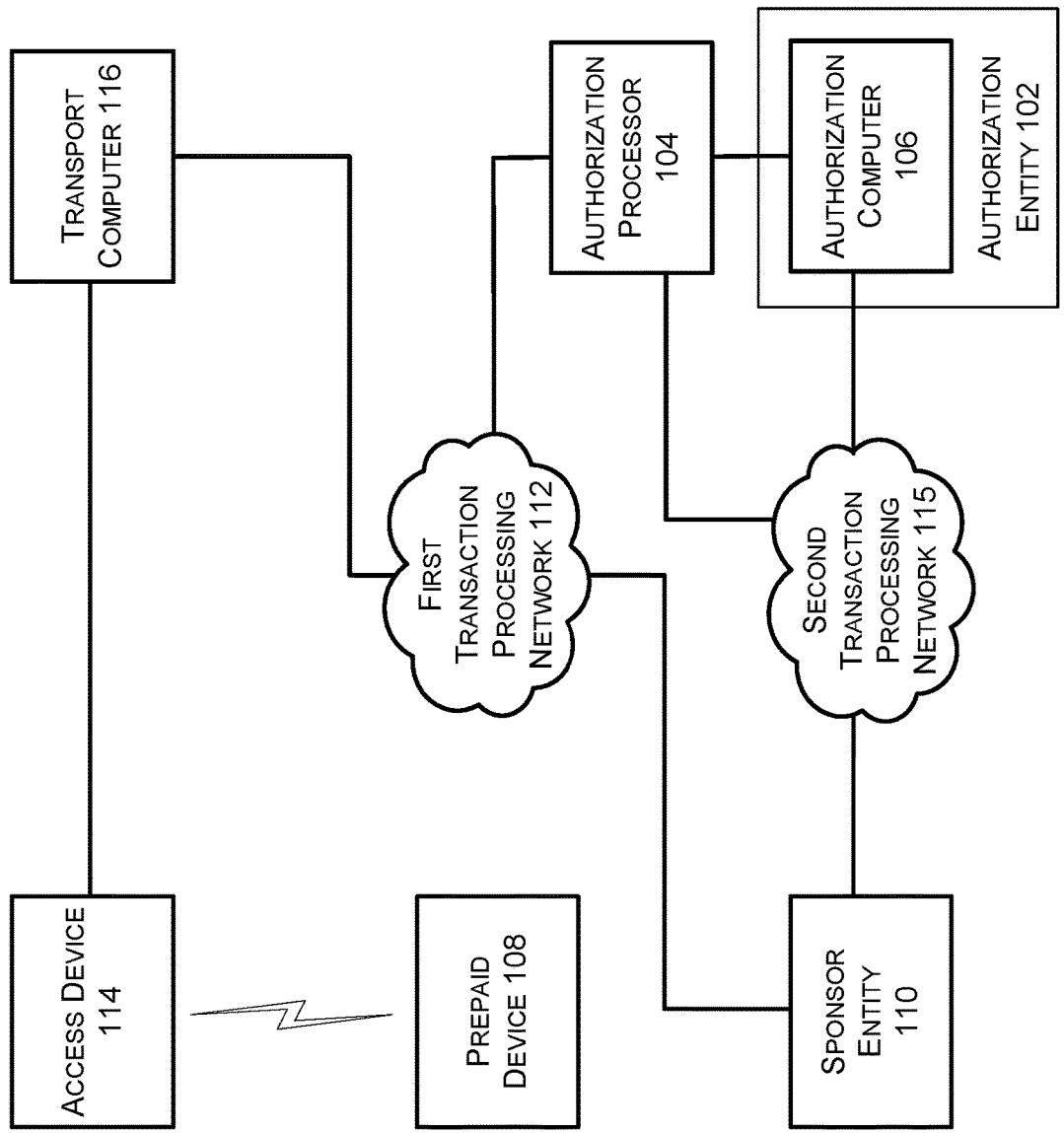
FIG. 1 depicts an example system architecture capable of implementing at least some embodiments of the current disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

An "access device" may be any suitable device for communicating with a merchant computer or payment processing network, and for interacting with a payment device, a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a prepaid device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device. In some embodiments, an access device may also be referred to as a terminal device.

"Account information" may refer to any information surrounding an account of a user. For example, account information may include account data and one or more account identifiers. In some embodiments, the account identifier may be a PAN or primary account number. The PAN may be 14, 16, or 18 digits. Account information may also include an expiration date associated with the account, as well as a service code and/or verification values (e.g., CVV, CVV2, dCVV, and dCVV2 values).

An "authorization request message" may be an electronic message that requests authorization for a transaction. In some embodiments, it is sent to a transport computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transport computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transport computer) to the merchant's access device (e.g. POS equipment) that indicates approval of the transaction. The code may serve as proof of authorization. As noted above, in some embodiments, a transport computer may generate or forward the authorization response message to the merchant.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer. An issuer is an example of an "authorization entity." An "authorization entity" may be any suitable entity that can authorization or not authorize a request (e.g., for access to a resource).

A "resource provider" may be an entity that can provide a resource such as a good or service. A "merchant" may be an example of a "resource provider," and may typically be an entity that engages in transactions and can sell goods or services, or provide access to goods or services.

A "mobile device" may be any computing device capable of being carried by a user. In some embodiments, a mobile device can include any suitable computing device configured to establish communication sessions with one or more connected devices and a transaction server (either directly or via a processing server) and (in some cases) to initiate transactions with the transaction server on behalf of the connected devices. In some embodiments, the mobile device may store one or more access credentials to be used in these transactions. In some embodiments, the mobile device may be configured to store one or more protocol sets related to transactions and/or connected devices. The mobile device may be further configured to confirm that transactions are in compliance with these transaction protocols prior to initiating the transactions.

A "prepaid device" may be any device capable of conducting a transaction with a prepaid account. In some embodiments, a prepaid device may convey prepaid account information to an external electronic device such as an access device. In some embodiments, the prepaid device may be a physical implement (e.g., a plastic card with a magnetic stripe). In some embodiments, the prepaid device may be a virtual implement (e.g., a token configured to be used by an e-wallet application executed on a mobile communication device).

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "sponsor entity" may refer to any entity which provides benefits (e.g., goods, services, and/or funds) to an account. In some embodiments, the sponsor entity may provide benefits to an account on a periodic basis. An example sponsor entity may be a government entity that provides disability or workers' compensation benefits. An account holder of the account to which the sponsor entity provides benefits may be referred to as a beneficiary.

A "token" may be a substitute for a real credential. In some embodiments, a token may include an identifier for a payment account that is a substitute for a real credential such as primary account number (PAN). For example, a token may include a series of numeric and/or alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. In other embodiments, a token may be mathematically derived (e.g., with an encryption key) from the real credential. Further, in some embodiments, the token format may be configured to allow the entity receiving the token to identify it as a token and recognize the entity that issued the token.

A "resource provider computer" may include any suitable computing device capable processing a transaction for a resource provider. In some embodiments, the resource provider computer may be affiliated with an electronic marketplace or a retail entity that maintains an internet presence. A resource provider computer may support transactions to provide resources (e.g., goods and/or services) to users. In some embodiments, a user may request a transaction by visiting a website affiliated with the resource provider computer and selecting one or more items to purchase. The resource provider computer may be in communication with other devices via a network connection.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

Details of some embodiments of the present invention will now be described.

FIG. 1 depicts an example system architecture capable of implementing at least some embodiments of the current disclosure. In FIG. 1, an authorization entity 102 may comprise an authorization processor 104 and an authorization computer 106. In some embodiments, the authorization entity 102 may be an issuer of a prepaid device 108. The authorization entity 102 may be in communication with a sponsor entity 110 via one or more transaction processing network 112.

In some embodiments, the prepaid device 108 may be configured to interact with an access device 114. Access device 114 may communicate information from the prepaid device 108 to a transport computer 116. The transport computer 116 may obtain authorization for the transaction from the authorization entity 102 via the one or more transaction processing network 112.

The authorization entity 102 may be any entity that maintains an account associated with the prepaid device 108. In some embodiments, the authorization entity 102 may operate authorization computer 106. In some embodiments, the authorization entity 102 may be an issuer of the prepaid device 108.

An authorization processor 104 may be in communication with the authorization computer 106. The authorization processor 104 may perform certain functions on behalf of the authorization entity 102. Such functions may include account management, analytics, etc. In some embodiments, the authorization processor 104 may be integrated into the authorization computer 104 instead of being a separate entity.

Authorization processor 104 may be any computing device or plurality of computing devices configured to receive a message such as a deposit load message, or authorization request message, for a transaction and determine whether the transaction is in compliance with one or more policies. For example, an authentication processor 104 may be configured to determine whether the transaction is in compliance with one or more fraud prevention policies. Upon determining that a requested transaction is in compliance with any applicable policies, the authorization processor 104 may be configured to forward the message to an authorization computer 106. An example of an authorization processor 104 may be an issuer processor computer.

Authorization computer 106 may be any computing device or plurality of computing devices configured to receive an authorization request message for a transaction, authorize or decline the transaction, and provide an authorization response message based on whether the transaction has been authorized or declined. The authorization computer 106 may determine whether to authorize or decline the transaction based on information associated with the transaction. For example, the authorization computer 106 may query one or more databases to determine a balance for the prepaid device 108, and may decline a transaction upon determining that an account associated with the prepaid device 108 has an insufficient balance to complete the transaction.

The prepaid device 108 store prepaid account information. In some embodiments, the prepaid device 108 may comprise a computer readable instructions installed on a mobile communication device that, when executed by a processor, cause the mobile communication device to generate and/or provide account information in response to received transaction information. The prepaid device 108 may include a communication interface configured to enable communication between the prepaid device 108 and another electronic device (e.g., access device 114). Examples of a communication interface may include one or more radio frequency (RF) transceivers configured to send and receive communications using near-field communications (NFC), or other radio frequency or wireless communication protocols such as Bluetooth, Bluetooth low-energy (BLE), a wireless local area network (e.g., WiFi), iBeacon, etc. In some embodiments, the communication interface may include an infrared communication device. In some embodiments, the communication interface may include both long range and short range communication means. For example, the communication interface may include an antenna configured to connect to a cellular network in order to enable communication with various other components of the depicted architecture.

In some embodiments, the communication technology used by the prepaid device 108 may depend on the type of power source used by the connected device. For example, if the device has access to a regular, external power supply (e.g., as is common for smart refrigerators and other devices such as washer/driers, garage doors, cars, etc.) it may include a WiFi interface. Alternatively, if the device relies on a battery instead of an external power supply, it may include a means for communication that consumes less power, such as low power Bluetooth interface, a ZigBee interface, a near field communication (NFC) or radio frequency (RF) interface, or any other suitable wireless access interface.

The sponsor entity 110 operate a computing device, including a remotely located server computer (e.g., a sponsor entity computer). It may be configured to initiate funding events such as function transactions in relation to an account/prepaid device 108. In some embodiments, a sponsor entity 110 may be configured to initiate an automated clearinghouse (ACH) deposit to an account associated with a prepaid device 108 upon determining that one or more conditions have been met. In some embodiments, a sponsor entity 110 may initiate multiple funding events. For example, a sponsor entity 110 may initiate funding events on a periodic basis. The sponsor entity 110 may be unaffiliated with a holder of the prepaid device 108 and/or a user associated with an account maintained by the authorization entity 102. If the sponsor entity 110 is an organization such as a government, insurance company, etc., then the sponsor entity 110 may utilize its own financial institution such as a bank to initiate a funding event.

FIG. 1 also shows a first transaction processing network 112 that may be configured to process payment transactions. In some embodiments, the first transaction processing network 112 may include a credit and/or debit card processing network. Such networks can switch transactions between multiple entities such as acquirers and issuers for transaction approvals. In FIG. 1, the first transaction processing network 112 may allow the resource provider computer 116 to communicate with the authorization processor 104, and optionally the sponsor entity 110.

The second transaction processing network 115 may be the same or different type of network than the first transaction processing network 112. For example, the second transaction processing network 115 may be an ACH network.

In some examples, the first and second transaction processing networks 112, 115 may include any one or a combination of many different types of networks, such as cable networks, the Internet, wireless networks, cellular networks, and other private and/or public networks.

An access device 114 may be any computing device or plurality of computing devices configured to complete a transaction. In some embodiments, an access device 114 may be a point of sale (POS) device such as a register. In some embodiments, an access device 114 may restrict access to a resource or service. In some embodiments, the access device 114 may be owned and/or operated by one of the parties to a transaction that the access device 114 is configured to complete. In some embodiments, the access device 114 may be configured to transmit transaction information to a prepaid device 108 and in response, receive information (e.g., account information) from the prepaid device 108, which may be forwarded to an acquirer.

Resource provider computer 116 may be any computing device or plurality of computing devices configured to receive a transaction request and initiate a transaction. In some embodiments, the resource provider computer 116 may be associated with an electronic commerce site. For example, the resource provider computer 116 may maintain a catalog of items and/or services available for purchase via a webpage. In another embodiment, a resource provider computer 116 may be an access device. In some embodiments, the resource provider computer 116 may be owned/operated by a merchant at a physical location. For example, a number of point of sale terminals may be in communication with a resource provider computer 116 that manages transactions for a retail location. The resource provider computer 116 may also be associated with a utility company or other resource provider. In some embodiments, the resource provider computer 116 may enable a user to pay a bill or other outstanding debt related to resource acquisition. The resource provider computer 116 may also be configured to complete a transaction upon receiving an authorization response message indicating that a transaction has been approved.

In some embodiments, the resource provider computer 116 may be in communication with an acquirer computer. An acquirer computer may be any computing device or plurality of computing devices configured to process transaction information received from the resource provider computer 116 and generate and/or transport an authorization request message to be transmitted to the authorization entity 102. In some embodiments, the acquirer computer may be owned and/or operated by a banking institution with which the operator of the resource provider computer 116 maintains an account. In some embodiments, the acquirer computer and the authorization entity 102 may be the same entity. For example, the authorization entity 102 may be configured to receive transaction information from the resource provider computer 116 and authorize or decline the transaction. In some embodiments, the acquirer may be a third party entity (e.g., an entity unaffiliated with either the authorization entity 102 or the resource provider computer 116).

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
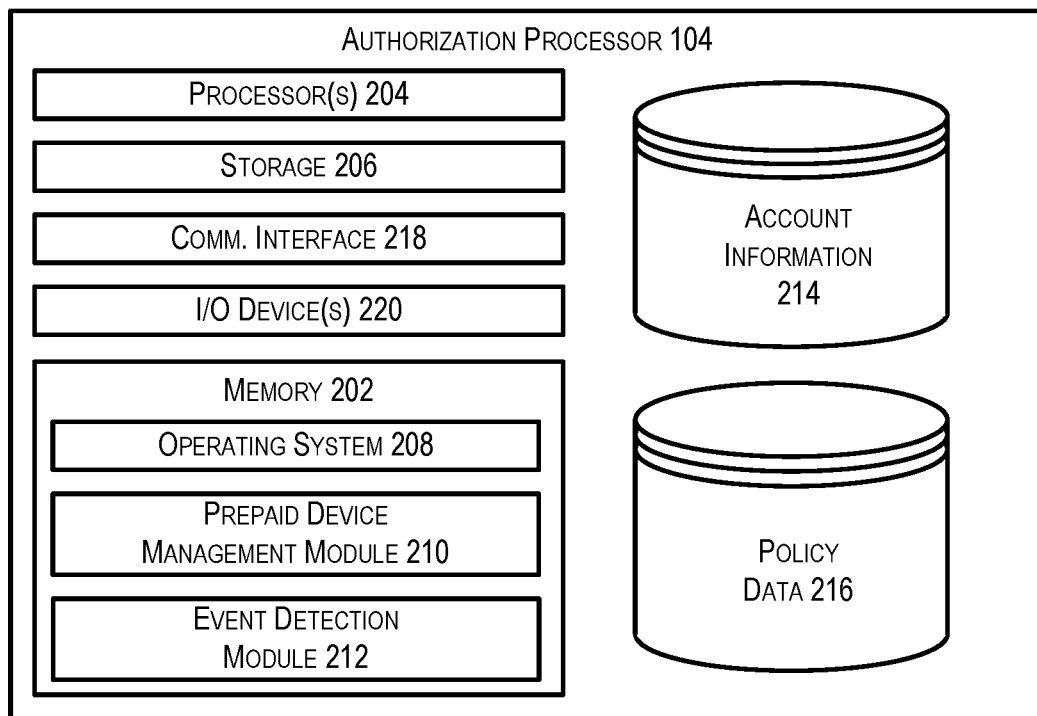
FIG. 2 depicts an example authorization processor configured to store and manage prepaid device information in accordance with at least some embodiments.

FIG. 2 depicts a block diagram of an authorization processor 104 configured to store and manage prepaid device information in accordance with at least some embodiments.

The authorization processor 104 may be any type of computing device capable of maintaining accounts and ensure that transactions associated with the prepaid accounts are in compliance with relevant policies. In at least some embodiments, the authorization processor 104 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these program instructions. Depending on the configuration and type of authorization processor 104, the memory 202 may be volatile (such as random access memory (RAM)) and/or non-volatile (such as read-only memory (ROM), flash memory, etc.). The authorization processor 104 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the mobile device. In some embodiments, the memory 202 may include multiple different types of memory, such as static random access memory (SRAM), dynamic random access memory (DRAM) or ROM.

Turning to the contents of the memory 202 in more detail, the memory 202 may include an operating system 208 and one or more application programs or services for implementing the features disclosed herein including at least a module for managing prepaid device accounts (prepaid device management module 210) and/or a module for detecting and handling events (event detection module 212).

The authorization processor 104 may also include account information database 214, which provides data associated with one or more payment accounts (e.g., account balances, etc.) and a policy data database 216, which stores information on one or more policies for which transactions should be in compliance.

In some embodiments, the prepaid device management module 210 may, in conjunction with the processor 204, be configured to manage accounts associated with prepaid devices. In some embodiments, the prepaid device management module 210 may cause the processor 204 to update an account status associated with a prepaid account. In some embodiments, the prepaid device management module 210 may cause the processor 204 to update a balance associated with a prepaid account. For example, upon determining that an account associated with a prepaid device has met each of the expiration conditions associated with the prepaid device, the prepaid device management module 210 may cause, a status of the account to be updated to "expired," the balance of the account to be zeroed out, and the prepaid device to be deactivated.

In some embodiments, the event detection module 212 may, in conjunction with the processor 204, be configured to detect events associated with one or more accounts, determine whether the detected event is in compliance with one or more policies, and initiate an appropriate action based on the event. For example, the event detection module 212 may cause the authorization processor to detect a transaction event (e.g. by receiving an authorization request message) in which payment is requested to be made from an account. In this example, the event detection module may determine whether the event complies with one or more policies (e.g., fraud prevention policies) and upon determining that the event is in compliance with the one or more policies, forward the transaction event to an authorization computer. If the funding event is not in compliance with the one or more policies, the event detection module 212 may cause the processor to provide a notification to a sponsor entity computer that originated the funding event indicating that the funding event is not in compliance with the policies. In another example, the event detection module 212 may cause the authorization processor to detect a funding event associated with an account with a current status of "expired." In this example, the event detection module 212 may, upon determining that the funding event is in compliance with any applicable policy, provide instructions to the prepaid device management module 210 to cause the prepaid device to be re-issued.

The authorization processor 104 may also contain communications interface(s) 218 that enable the authorization processor 104 to communicate with a stored database, another computing device or server, one or more terminal devices, connected devices, and/or other electronic devices on a network. The authorization processor 104 may also include input/output (I/O) device(s) and/or ports 220, such as for enabling connection with a keyboard, a mouse, a pen, a voice input device, a touch input device, a display, speakers, a printer, etc.

Figure 3:
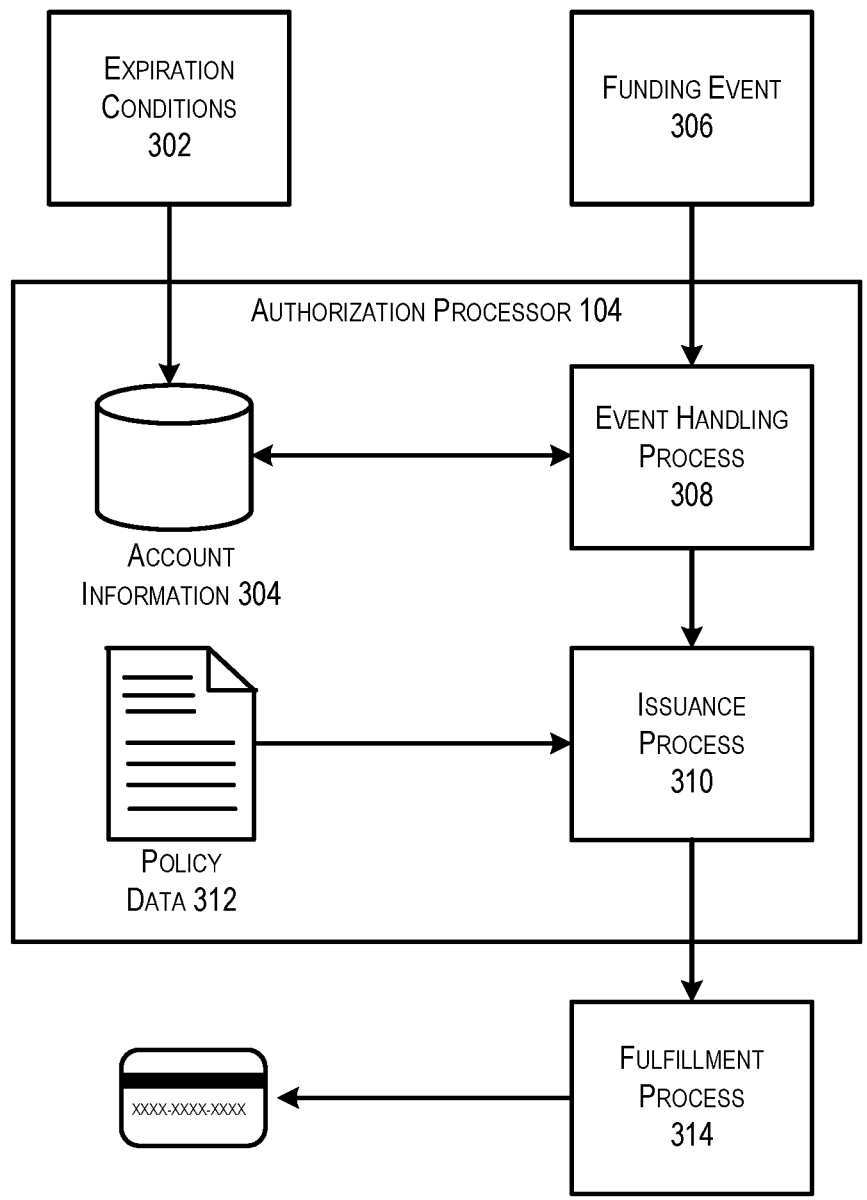
FIG. 3 depicts an example data flow that may be implemented in accordance with at least some embodiments.

FIG. 3 depicts an example data flow that may be implemented in accordance with at least some embodiments. The data flow depicted in FIG. 3, may be implemented at least by the components of the example architecture depicted in FIG. 1.

In some embodiments, one or more expiration conditions 302 may be detected in relation to a prepaid account. For example, one such expiration condition may be that the most recent funding event associated with an account may have occurred more than a threshold period of time before the current date. For example, a prepaid account may expire if the last time that the prepaid account was funded was over a year ago. In another example, the account may have had a zero (or near zero) balance for a threshold period of time. In another example, a sponsor entity associated with the account may provide an indication that the account is no longer being funded. In some embodiments, accounts may be evaluated on a periodic basis to determine whether expiration conditions 302 are applicable. For example, accounts may be evaluated once a month, once a week, once every two weeks, etc.

Upon detecting that expiration conditions 302 have been met with respect to a particular account, a status and/or other suitable account information may be updated to reflect that the account is expired. The account may remain recorded and available for receiving funds although the status is updated to be expired. If the account is expired, then a user cannot use the account for pay for goods or services. Information stored in account data 304 associated with the account may be updated to reflect the new status. For example, an account balance associated with the account may be zeroed out (set to zero). In some cases, a balance remaining in the account before the account is zeroed may be provided to a user associated with the account (e.g., via a check sent to the user's mailing address). Upon expiration of the account, any prepaid devices currently linked to the account may be deactivated. For example, a token linked to the account that was provided to a mobile computing device may be deactivated so that an e-wallet application on the mobile computing device may no longer be used to purchase items. The token may be deactivated by registering its deactivation status in a central computer such as the authorization processor 104 and/or the first transaction processing network 112. If a user attempts to use the token, the authorization processor 104 and/or the first transaction processing network 112 may reject the transaction (or decline an authorization request message).

The authorization processor 104 may detect a funding event 306. In some embodiments, the funding event may be an automated clearinghouse (ACH) deposit initiated by a sponsor entity to a particular account residing at the authorization processor 104. Upon detecting the funding event 306, the authorization processor 104 may initiate an event handling process 308. During the event handling process, the authorization processor 104 may categorize the event by identifying a type associated with the event. If, during the event handling process 308, the authorization processor 104 determines the funding event is associated with an account that is expired, but not closed, then the authorization processor 104 may initiate an issuance process 310 to reissue a device for the expired account.

In some embodiments, the funding event may utilize account information. In some embodiments, the account information may be used to update an account associated with the funding event. For example, a sponsor entity may provide updated address and/or contact information to be associated with the account. In this example, account information 304 may be updated to reflect the provided information.

In some embodiments, the authorization processor 104 may determine, during event handling, that an account with an expired status is to reissue a device. The authorization processor 104 may initiate an issuance process 310 to reissue a device for the account. During the issuance process 310, the authorization processor 104 may determine whether the funding event 306 and/or the account is in compliance with various policies (e.g., card reissuance policies) stored in policy data 312. For example, the account may be evaluated to determine if it has been associated with any fraudulent activity. In this example, a fraud prevention policy may include instructions to query an address associated with the account to determine if any other accounts are associated with the same address. In another example, an address associated with the account may be evaluated in order to determine whether multiple prepaid devices are associated with that address. In another example, another policy that is not fraud related may inquire as to whether the current address of the accountholder matches the address on file. Upon determining that the funding event and account are each in compliance with the relevant policies, the issuance process 310 may cause the authorization processor 104 to update a status associated with the account to "open."

Upon updating the status of the account, the authorization processor 104 may initiate a fulfillment process 314. The fulfillment process 314 may initiate fulfillment of a new prepaid device. For example, in the scenario in which the prepaid device is a physical implement, the fulfillment process 314 may cause a printing device to construct the physical implement with information specific to the relevant account. In a scenario in which the prepaid device is an e-wallet application (or other mobile application installed on a mobile device), the fulfillment process 314 may cause a token service to generate a new token to be used in relation to the account.

Upon completion of the fulfillment process 314, the newly issued prepaid device may be distributed to a user associated with the account. For example, in the case that a physical implement has been constructed, the physical implement may be addressed to the user and may be provided to a delivery service. In an example in which a token has been generated, the token may be pushed to the mobile device in a software update or push notification.

Figure 4:
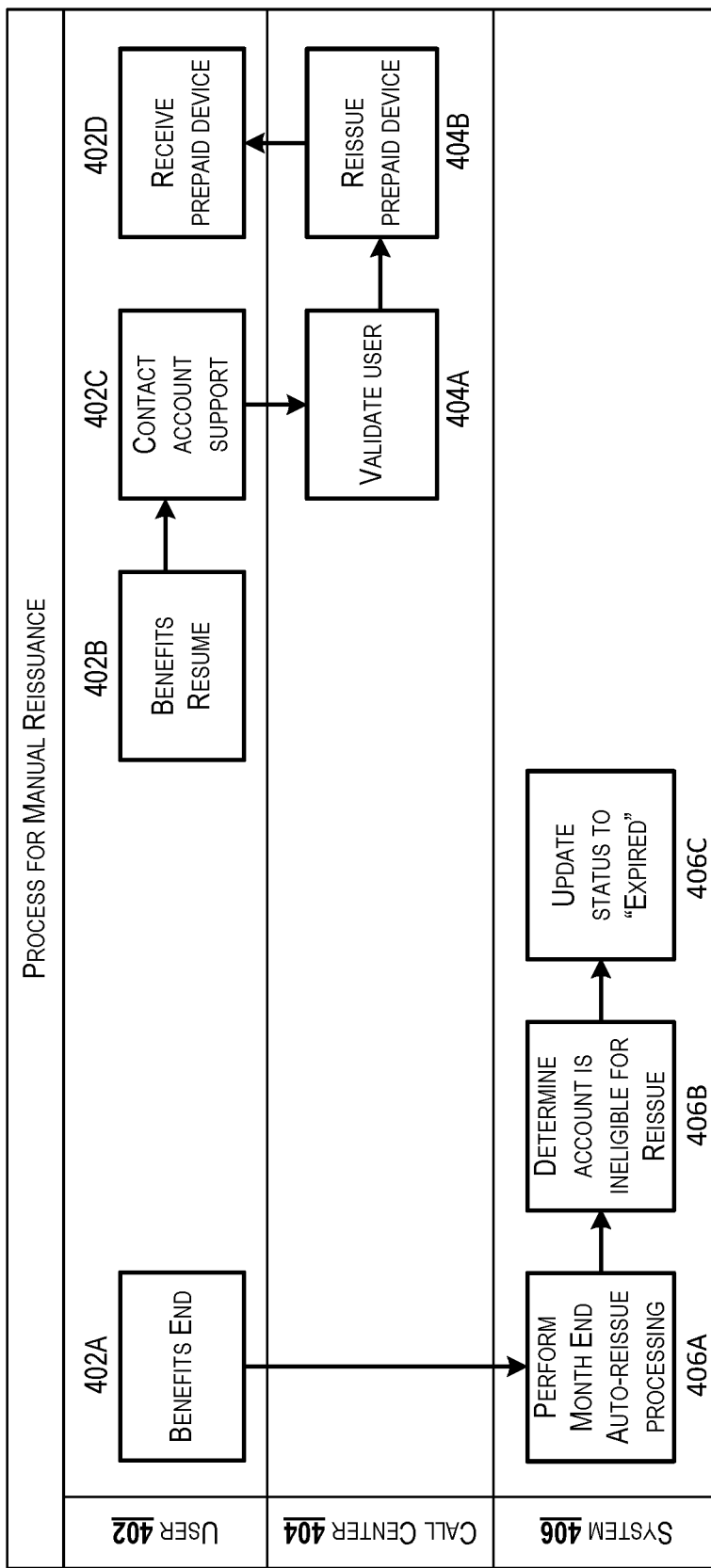
FIG. 4 depicts an example process for reissuing an expired prepaid device associated with sponsored benefits using manual elements.

FIG. 4 depicts an example process for reissuing an expired prepaid device associated with sponsored benefits using manual elements. FIG. 4 focuses on interactions between a user 402, a call center 404, and the system 406. It should be noted that the described interactions and entities are provided for illustrative purposes only, and are intended to be non-limiting. In this example process, a user 402 may be a beneficiary of the prepaid device, a call center 404 may be an entity with access to account information that is able to initiate a reissuance process, and a system 406 may be an example of the authorization entity 102 depicted in FIG. 1. In accordance with at least one embodiment, the process of FIG. 4 may be performed by at least the authorization entity 104 depicted in FIG. 1.

In the depicted example process, a user 402 may be receiving benefits provided by a sponsor entity not affiliated with the user 402 (e.g., a government agency). The benefits may be accessed by a prepaid device associated with an account to which the benefits are deposited. In some embodiments, benefits may be provided by the sponsor entity on a period basis (e.g., once a month, once a week, biweekly, etc.). The benefits provided by the sponsor entity may end at 402A. In some embodiments, a sponsor entity may provide an indication to the system 406 that benefits are no longer being provided (e.g., that the benefits have ended) for an account. In some embodiments, the sponsor entity may simply stop providing periodic deposits to the account without providing a notification to the system 406.

In this example scenario, the system 406 may evaluate accounts for reissuance eligibility on a periodic basis at 406A. For example, the system 406 may evaluate accounts on a monthly basis to determine if expiration conditions have been met with regard to the account. If expiration conditions are met by the account, then the system 406 may determine that the account is ineligible for reissue at 406B. Some example expiration conditions may include that no transactions have been conducted on the account within a threshold period of time, no deposits have been made to the account within a threshold period of time, the account balance is under a threshold minimum account balance, etc. By way of illustration, the system 406 may determine that no deposits have been made to a prepaid account within the last 90 days. The system 406 may also determine that a balance of the prepaid account is currently below a threshold minimum value of $100. Based on this analysis, the system 406 may determine that the prepaid account is not eligible for reissue.

If expiration conditions have not been met by an account, then the system 406 may renew the account or continue to associate it with an active status. Otherwise, the system 406 may update the status of the account to reflect that it is expired or inactive at 406C. In this scenario, a current balance of the account may be zeroed out and a payment in the amount of the current balance may be provided to the user 402. Additionally, when an account status is updated to "expired," any prepaid device associated with the account may be deactivated.

In this example process for reissuing an expired prepaid device associated with sponsored benefits using manual elements, a sponsor may resume providing benefits to a particular account at 402B. For example, the sponsor may once again begin depositing funds into the account. In this scenario, the prepaid device associated with the account may have already been deactivated, meaning that the user 402 will not have access to those funds. In this scenario, the user 402 may be instructed to contact the call center 404 to initiate a reissuance of the prepaid device at 402.

In this example, the user may contact a call center 404 to speak with a customer service representative (CSR), who may validate the user (404A) by accessing information associated with the account and confirming that the user is authorized to access the funds. The CSR may then initiate a reissuance of the prepaid device at 404B by submitting an order to construct a new prepaid device to be mailed to the user 402. The user may then receive the constructed prepaid device via post, or another delivery service at 402D. Depending on the amount of time that it takes the user 402 to contact the call center, wait times associated with the call center 404, and a time for constructing and shipping the prepaid device, the user 402 may not receive the prepaid device for several weeks.

Figure 5:
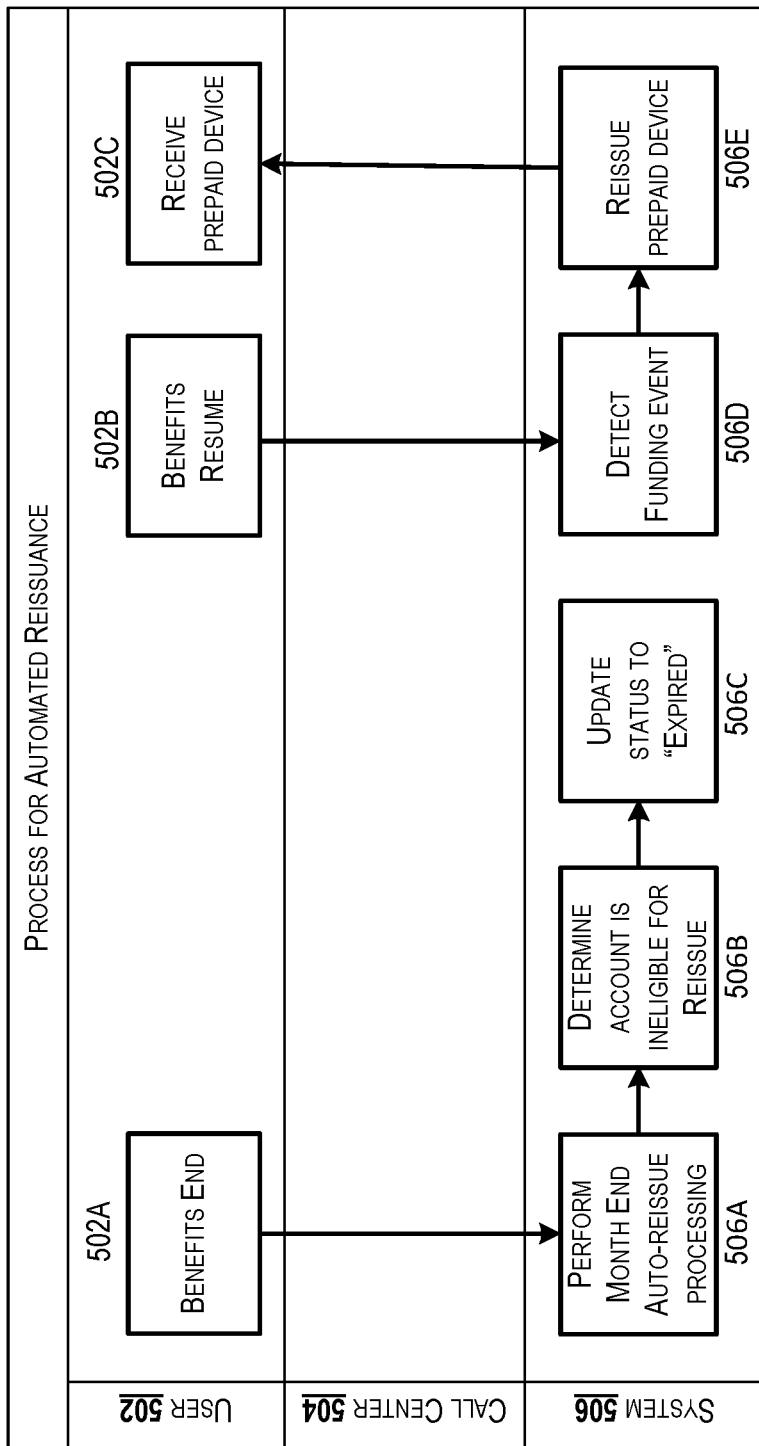
FIG. 5 depicts an example fully automated process for reissuing an expired prepaid device associated with sponsored benefits.

FIG. 5 depicts an example fully automated process for reissuing an expired prepaid device associated with sponsored benefits. Similar to FIG. 4 above, FIG. 5 focuses on interactions between a user 502, a call center 504, and the system 506. In FIG. 5, the status of an account may be updated to "expired" in a fashion similar to that described in FIG. 4.

In this example fully automated process for reissuing an expired prepaid device associated with sponsored benefits, a sponsor may resume providing benefits to a particular account at 502B. For example, the sponsor may once again begin depositing funds into the account. In this scenario, the system 506 may detect a funding event initiated by the sponsor entity. For example, the sponsor entity may initiate an ACH deposit from an account owned/operated by the sponsor entity.

Upon detecting a funding event associated with an expired account at 506D, the system 506 may determine whether to reissue a prepaid device for the account as long as the account and funding event are in compliance with various policies. For example, the system 506 may verify that an address associated with the account is not also associated with another account. In another example, the system 506 may verify that an address associated with the account is the same as an address that the sponsor has on record. For example, upon detecting the funding event, the system 506 may send a request to the sponsor entity for address information associated with the account.

The system 506, upon determining that the account and funding event is in compliance with each of the relevant policies, may reissue a prepaid device associated with the account at 506E. It should be noted that in the example process of FIG. 5, reissuance of the prepaid device is initiated by system 506 automatically (e.g., without intervention by the call center 504 or another entity). In some cases, the user 502 may not even be aware that a new prepaid device may be reissued. In the depicted example, the reissuance of the prepaid device results in delivery of the prepaid device to the user 502 (e.g., at the user's address of record) at 502C.

By way of illustrative example, consider a scenario in which a user is receiving periodic payments from a government program (e.g. unemployment benefits, social security benefits, welfare benefits, etc.). The periodic payments may be deposited to an account maintained by an authorization entity. The user may be provided with a card or token that may be used to access the funds in the account (e.g., a plastic payment card with a magnetic stripe).

In this illustrative example, the user may be temporarily disqualified from receiving those periodic payments. For example, the periodic payments may be halted if the underlying reason for receiving the benefits no longer applies. If the payments have been halted for a period of time (e.g., there have been no new deposits within that time), the account may be expired.

Continuing the illustrative example, the user may apply for, and subsequently qualify for, benefits from the government program once again at a later date. In this scenario, the government program may begin depositing funds into the already established account associated with the user. Upon detecting that this is the case, the authorization entity may automatically cause a new prepaid device to be constructed and sent to the user. For example, if the prepaid device is a plastic card with a magnetic stripe, the authorization entity (or an entity acting on behalf of it) may cause a new plastic card to be printed. The prepaid device may then be shipped to the user at an address indicated in the account.

Figure 6:
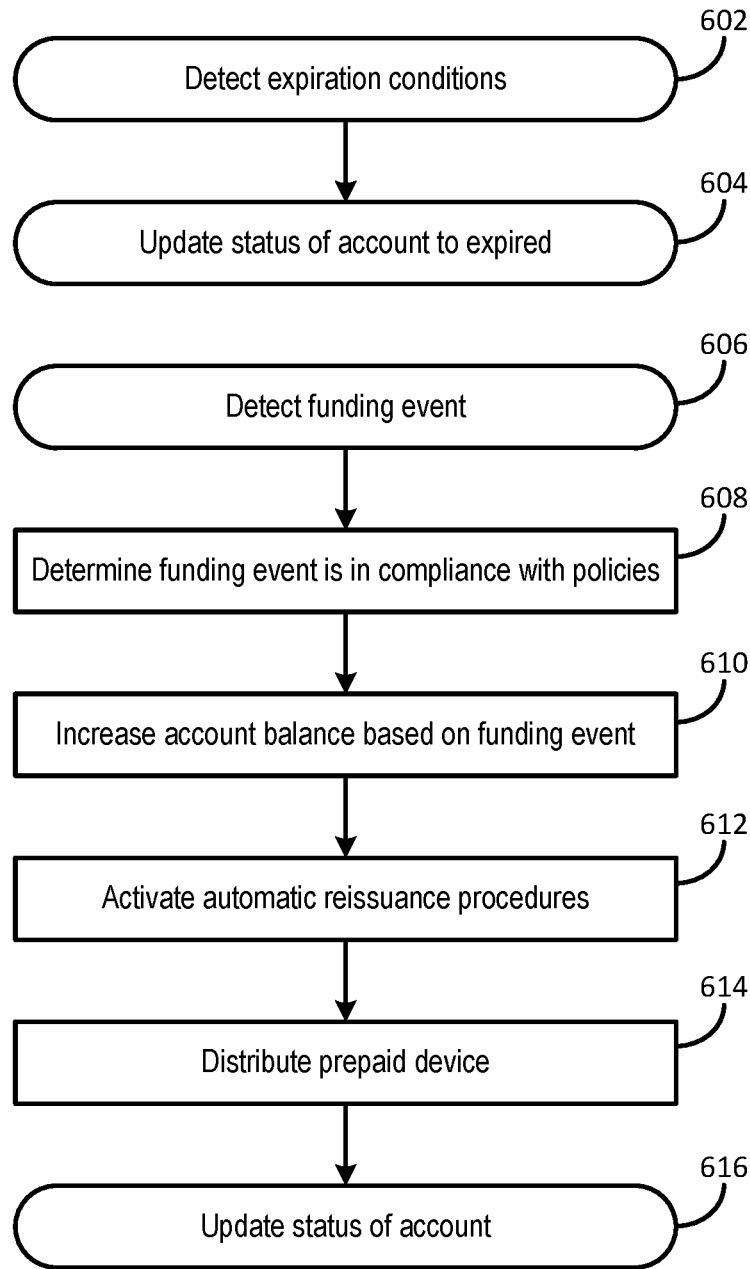
FIG. 6 depicts a flow diagram illustrating a process for automatically reissuing prepaid devices in accordance with at least some embodiments.

FIG. 6 depicts a flow diagram illustrating a process for automatically reissuing prepaid devices in accordance with at least some embodiments. In accordance with at least one embodiment, the process 600 of FIG. 6 may be performed by at least the authorization entity 104 depicted in FIG. 1.

Process 600 may begin at 602, when one or more expiration conditions are detected with respect to an account. Expiration conditions may include a number of factors that, when present, indicate that a status associated with the account should be updated to an expired status. For example, factors that may be associated with an expiration condition may include a lack of activity on the account for a predetermined amount of time, a low or zero balance on the account, no detected funding events for a predetermined period of time, or any other suitable indicator that the account should be expired. In some embodiments, a sponsor entity may provide an indication that the account is no longer being funded.

A status associated with the account may be updated to reflect an expired state at 604. In some embodiments, the account may be updated to reflect an expired status if any expiration conditions are met by the account. In some embodiments, the account may be updated to an expired status only if all expiration conditions are met by the account. To update the status of an account to reflect an expired state, an authorization entity may zero out a balance of the account and/or deactivate a prepaid device associated with the account.

At 606, a funding event may be detected in relation to the account. For example, a sponsor entity may initiate an ACH deposit to the account. In this example, the authorization entity may determine that the account is currently expired.

At 608, the funding event may be evaluated to determine if the funding event is in compliance with a set of policies. For example, the authorization entity may determine whether the address associated with the account is the same address identified by the sponsor entity. In another example, the authorization entity may query a database to determine if more than one account is associated with the address associated with the expired account. Upon determining that the funding event is in compliance with any applicable policies.

At 610, a balance of the account may be updated to reflect information provided in the funding event. For example, if the funding event is an ACH deposit initiated by the sponsor entity, then the ACH deposit may be completed and funds may be deposited into the account. In some embodiments, the funding event may include information associated with the account, such as address information. The address information maintained by the authorization entity may be updated to reflect the newly provided address information.

At 612, reissuance procedures may be initiated automatically by the authorization entity. For example, if the prepaid device is a physical implement (e.g., a plastic magnetic stripe card), the reissuance procedures may cause the authorization processor to send instructions to a printing device connected to the authorization processor to cause it to print the new physical implement with information specific to the relevant account. In a scenario in which the prepaid device is an e-wallet application (or other mobile application installed on a mobile device), the reissuance procedures may cause a token service to generate a new token to be used in relation to the account.

At 614, a new prepaid device may be distributed to the user. For example, in the case that a physical implement has been constructed (e.g., a new plastic magstripe card has been printed), the physical implement may be addressed to the user and may be provided to a delivery service. In an example in which a token has been generated, the token may be pushed to the mobile device in a software update or in a push notification.

At 616, the status of the prepaid account may be updated to indicate an active status. In some embodiments, the status may be updated to an active status upon detecting that the user associated with the account has received the reissued prepaid device. For example, a user may indicate (e.g., via a phone system or network communication) that the user has received the prepaid device. In this example, the status of the account may be updated upon receiving the user indication. In some embodiments, the status of the account may be updated upon receiving an indication that the prepaid device has been delivered to an address associated with the user (e.g., via a shipping notification).

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Embodiments of the invention provide for a number of technical advantages. For example, embodiments of the invention enable an issuer of a prepaid device to generate and deliver a new prepaid device automatically upon detecting a funding event for the account. Embodiments of the invention eliminates the need for a beneficiary of the prepaid account to contact the issuer to be provided with a new prepaid device, and further eliminates the need for the user to re-enroll with the issuer. In addition, by reissuing a prepaid device upon detecting a funding event, the disclosure results in a prepaid device being provided in a more timely fashion than previously used techniques. Meanwhile, the verification that the account and funding event is in compliance with various policies allows the system to avoid potentially fraudulent transactions. Embodiments of the invention reduce the number of processing steps and computing resources and messages as compared to conventional methods.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for reissuing an expired prepaid device associated with sponsored benefits, wherein the prepaid device is associated with a financial payment account established by an issuer of the prepaid device, comprising:

generating, by an issuer computer, a data structure associated with the financial payment account and the prepaid device associated with the financial payment account, wherein the data structure comprises stored account information including one or more expiration conditions for the financial payment account, a balance of funds in the financial payment account, and a mailing address of a beneficiary of the financial payment account;

receiving, by the issuer computer, one or more automatic funding events into the financial payment account on a periodic basis, wherein the one or more automatic funding events are for the benefit of the beneficiary of the financial payment account, and wherein the one or more automatic funding events are initiated by a sponsoring entity which is unaffiliated with the beneficiary and the issuer computer, wherein the sponsoring entity is a government sponsored organization that owes a financial obligation to the beneficiary to provide the sponsored benefits using the prepaid device, wherein the beneficiary of the financial payment account is a holder of the prepaid device;

determining, by the issuer computer, based on the one or more expiration conditions, that the financial payment account used by the beneficiary and maintained by the issuer computer has expired;

updating, by the issuer computer, the data structure associated with the financial payment account to change a status of the financial payment account to reflect that it is an expired financial payment account and updating the balance of the funds in financial payment account to be zero, wherein the one or more expiration conditions comprise a lack of detected funding events for a predetermined period of time, wherein updating the status comprises deactivating the prepaid device and delivering any balance in the financial payment account to the beneficiary;

maintaining the expired financial payment account in an open state;

automatically detecting, by the issuer computer, a funding event related to the expired financial payment account, the funding event initiated by the sponsoring entity and involving a deposit of sponsored benefits into the expired financial payment account used by the beneficiary;

retrieving, by the issuer computer, one or more reissuance policies associated with the expired financial payment account, wherein at least one reissuance policy comprises a comparison of a current address of the beneficiary with the mailing address of the beneficiary stored in the account information and a determination that no other accounts or prepaid devices are associated with the current address;

determining, by the issuer computer, based on information associated with the expired financial payment account, that the funding event is in compliance with the one or more reissuance policies;

updating, by the issuer computer, the data structure associated with the account to change the status of the expired financial payment account to reflect that it is an open financial payment account and to change the balance in the account from zero to an amount of the detected funding event; and automatically re-issuing, by the issuer computer, a new prepaid device associated with the financial payment account to the beneficiary by causing a new prepaid device associated with the prepaid account to be generated and sent to the beneficiary, wherein the new prepaid device is associated with the funding event.

2. The method of claim 1, wherein the one or more reissuance policies include one or more policies to prevent fraud associated with the financial payment account.

3. The method of claim 1, wherein the funding event comprises a transfer of funds from a sponsor entity that is not the beneficiary to the financial payment account.

4. The method of claim 1, wherein changing the status of the financial payment account to reflect that it is an expired financial payment account comprises:
zeroing out an account balance associated with the financial payment account; and
deactivating a current prepaid device associated with the financial payment account.

5. The method of claim 1, wherein the funding event is an automated clearing house (ACH) deposit event.

6. An authorization processor for reissuing an expired prepaid device associated with sponsored benefits, wherein the prepaid device is associated with a financial payment account established by an issuer of the prepaid device, comprising:
a data processor; and
a memory including instructions that, when executed by the data processor, causes the authorization processor to:
generate a data structure associated with a financial payment account and a prepaid device associated with the financial payment account, wherein the data structure comprises stored account information including expiration conditions for the financial payment account, a balance of funds in the financial payment account, and a mailing address of a beneficiary of the financial payment account;
receive one or more automatic funding events into the financial payment account on a periodic basis, wherein the one or more automatic funding events are for the benefit of the beneficiary of the financial payment account, and wherein the one or more automatic funding events are initiated by a sponsoring entity which is unaffiliated with the beneficiary and an issuer computer, wherein the sponsoring entity is an organization that owes a financial obligation to the beneficiary to provide the sponsored benefits using the prepaid device, wherein the beneficiary of the financial payment account is a holder of the prepaid device;
detect that the financial payment account associated with the prepaid device operated by the beneficiary and maintained by the authorization processor has lapsed based on a lack of detected funding events for a predetermined period of time;
update the data structure associated with the financial payment account to change a status of the financial payment account to indicate an expired status and update the balance of the financial payment account to be zero, wherein updating the status comprises deactivating the prepaid device and delivering any balance in the financial payment account to the beneficiary;
maintain the expired financial payment account in an open state;
automatically detecting a funding event associated with the financial payment account, the funding event initiated by a sponsor entity and involving a deposit of sponsored benefits into the financial payment account used by the beneficiary;
retrieve one or more reissuance policies associated with the financial payment account, wherein at least one reissuance policy comprises a comparison of a current address of the beneficiary with the mailing address of the beneficiary stored in the account information and a determination that no other accounts or prepaid devices are associated with the current address;
determine that the funding event is in compliance with one or more policies associated with the financial payment account based on information about the financial payment account;
upon determining that the funding event is in compliance with the one or more policies associated with the financial payment account, automatically re-issue the prepaid device associated with the financial payment account to the beneficiary by:
causing a new prepaid device associated with the financial payment account to be generated and sent to the beneficiary, wherein the new prepaid device is associated with the funding event; and
updating the data structure associated with the account to change the status of the financial payment account from indicating an expired status to indicate that it is an active financial payment account; and
increase an account balance associated with the account from zero by an amount indicated in the funding event.

7. The authorization processor of claim 6, wherein causing the new prepaid device associated with the financial payment account to be generated and sent to the beneficiary comprises:
sending instructions to a printing device connected to the authorization processor to cause it to print the new prepaid device; and
causing the new prepaid device to be sent to a beneficiary associated with the financial payment account.

8. The authorization processor of claim 6, wherein the prepaid device is a plastic card comprising a magnetic stripe.

9. The authorization processor of claim 6, wherein the new prepaid device associated with the financial payment account is issued without human intervention.

10. The authorization processor of claim 6, wherein the prepaid device is a token configured for use by a mobile device.

11. The authorization processor of claim 10, wherein issuing the new prepaid device associated with the financial payment account comprises providing the token to an e-wallet application stored on the mobile device.

12. The authorization processor of claim 11, wherein the token is provided to the e-wallet application stored on the mobile device via a software update or push notification.

13. The authorization processor of claim 6, wherein the instructions further cause the authorization processor to, upon determining that the funding event is not in compliance with the one or more policies, provide a notification to the sponsoring entity that originated the funding event.

14. The method of claim 1, wherein an indication of the funding event related to the expired financial payment account includes user information, and wherein determining that the funding event is in compliance with one or more reissuance policies comprises determining that the user information matches the account information stored in relation to the beneficiary.

* * * * *